(No Model.)  3 Sheets—Sheet 1.
C. L. OLMSTEAD.
SOLDERING MACHINE.
No. 535,723.  Patented Mar. 12, 1895.
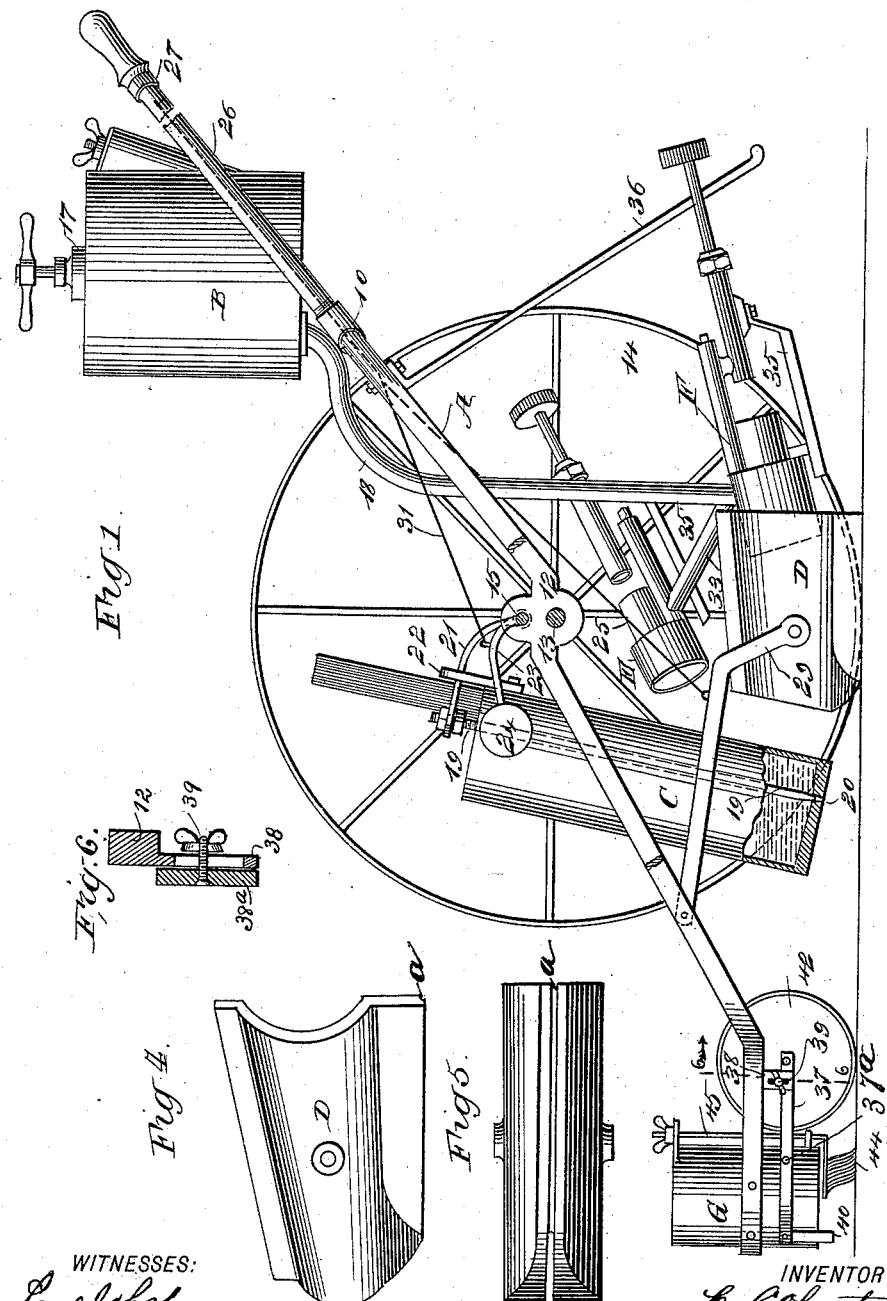
WITNESSES:
INVENTOR
C. L. Olmstead
BY
Munn & Co.
ATTORNEYS.

(No Model.)　　　　　　　　　　　　　　　　3 Sheets—Sheet 2.
C. L. OLMSTEAD.
SOLDERING MACHINE.
No. 535,723.　　　　　　　　　Patented Mar. 12, 1895.
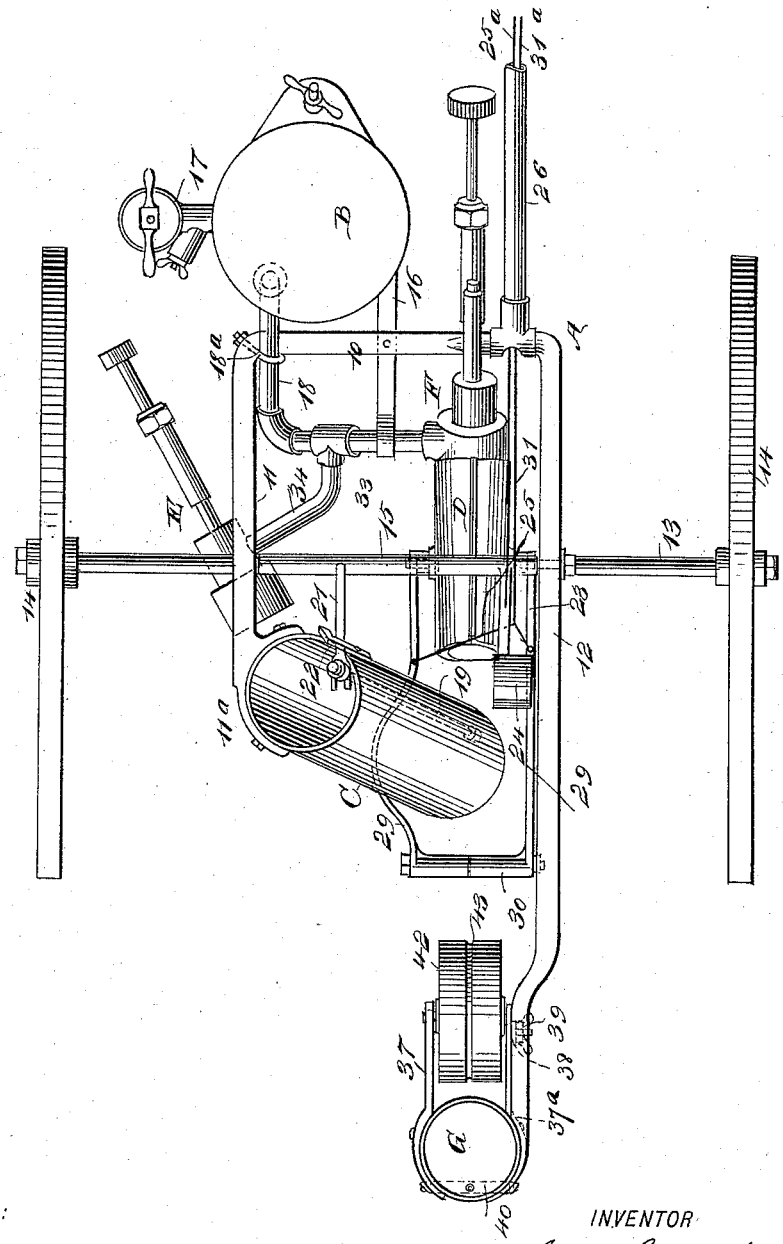
WITNESSES:
INVENTOR
C. L. Olmstead
BY Munn & Co.
ATTORNEYS.

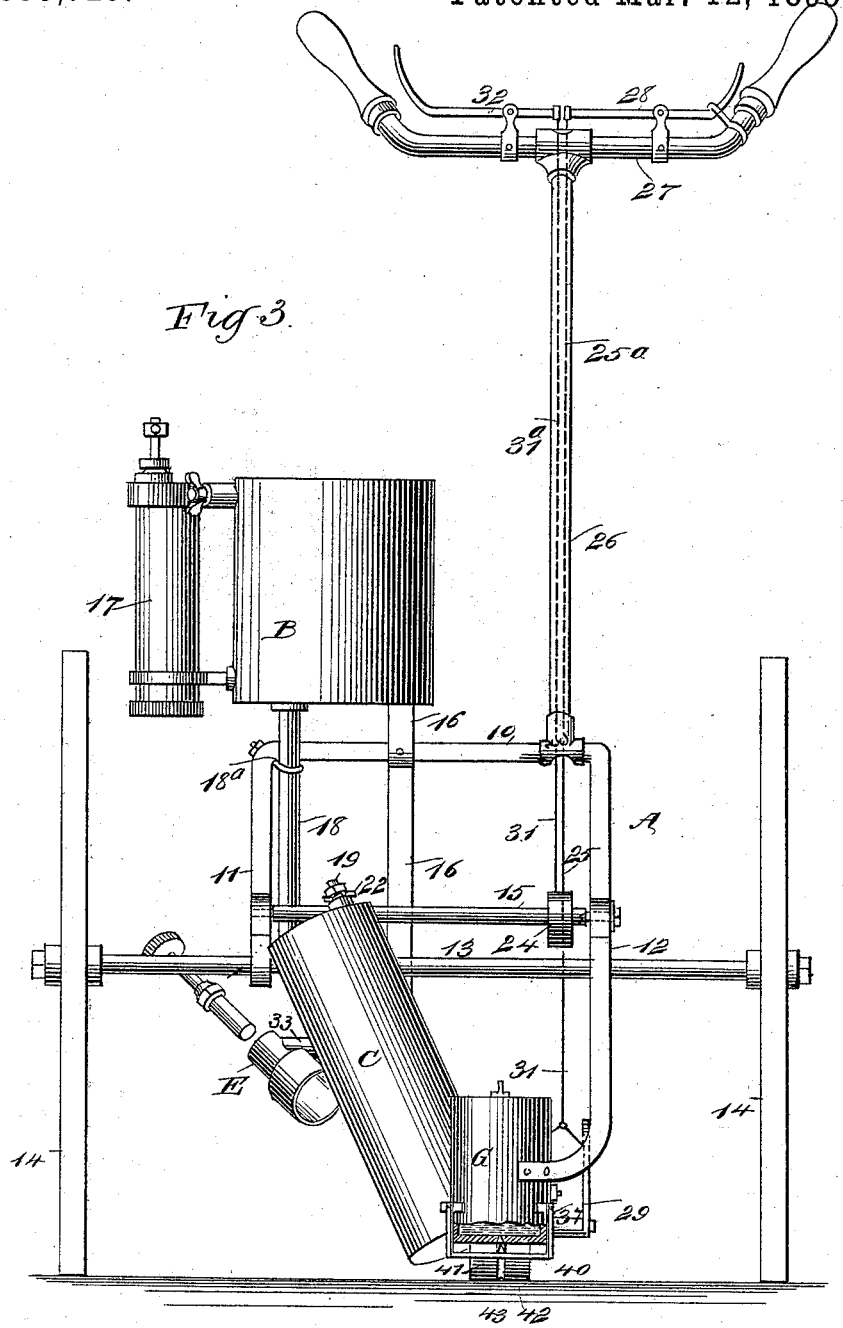

UNITED STATES PATENT OFFICE.

CHARLES L. OLMSTEAD, OF BIG TIMBER, MONTANA.

SOLDERING-MACHINE.

SPECIFICATION forming part of Letters Patent No. 535,723, dated March 12, 1895.

Application filed May 28, 1894. Serial No. 512,646. (No model.)

*To all whom it may concern:*

Be it known that I, CHARLES LEWIS OLMSTEAD, of Big Timber, in the county of Park and State of Montana, have invented a new and Improved Soldering-Machine, of which the following is a full, clear, and exact description.

My invention relates to an improvement in soldering machines, and it has for its object to provide a machine of this character which will be exceedingly simple and durable in its construction, and through the medium of which solder may be economically applied to the seams of roofing tin for example, or to the seams of tin employed to cover large surfaces.

A further object of the invention is to so construct the machine that the solder will be melted in a suitable receptacle forming a portion of the machine, and whereby also the machine will be guided upon the seam, acid being applied to the seam in advance of the application of the solder, and whereby also the smoothing iron will follow the solder receptacle, insuring the solder being conveniently and properly applied to and set upon the seam.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the machine, parts being broken away. Fig. 2 is a plan view thereof. Fig. 3 is a front elevation of the machine, parts being broken away. Fig. 4 is a detail view of one of the sections of the soldering iron. Fig. 5 is a bottom plan view of the soldering iron, and Fig. 6 is a detail sectional view taken on line 6—6 of Fig. 1.

In carrying out the invention, the frame A of the machine comprises an upper cross bar 10, a short leg 11, projected downwardly and forwardly from one end of the cross bar, the said short leg being made straight or rendered horizontal near its free end, and an opposing longer leg 12, which is likewise carried downwardly and forwardly, and is provided with a straight section between its ends, opposed to that of the shorter leg, and from the straight section the longer leg of the frame is carried downwardly preferably upon a decided inclination, and is made to terminate in a lower horizontal section, as is clearly shown in Fig. 1.

The axle 13 of the machine is journaled in the opposing straight sections of the two legs, and carries ground wheels 14. Above the axle a shaft 15 is journaled between the two legs of the frame in such manner that such shaft may rock, and a gasoline tank B, is supported by the bracket 16, or its equivalent, upon the upper cross bar 10 of the frame, and a pipe 33 to be later described, the said tank being preferably provided with an air pump 17, by means of which compressed air may be forced into the tank to insure the speedy delivery or feed therefrom of the gasoline, the feed pipe 18 being connected with the bottom of the tank. The feed pipe is secured to the frame through the medium of a clip 18ª, or equivalent device.

At the free end of the shorter leg of the frame A a solder receptacle C, is supported. This receptacle has an inclination downward and in direction of one side of the machine, likewise a downward and forward inclination, whereby the solder when placed in the receptacle will rest against the rear wall thereof, as shown in Fig. 1, and will likewise bear upon the bottom of the said receptacle. The solder receptacle is provided with a needle valve 19, seated at its lower end in an aperture 20 made in the bottom of the receptacle, as shown in Fig. 1.

An arm 21, is projected from the rock shaft 15, and is made to clamp the upper end of the needle valve; and this arm is limited, as far as its upward movement is concerned, by the guide plate or bracket 22, adjustably secured to the solder receptacle. The rock shaft 15 is provided with a second arm 23, which carries at its outer or forward end a weight 24; and this arm has attached to it one end of a chain, cord or link 31, detachably connected with a second cord or link 31ª, the latter being carried upward through a handle standard 26, secured to the upper cross bar 10 of the frame near one of its sides, the left-hand side for example.

The handle standard 26, is provided at its upper end with a handle bar 27, and the said handle bar at one side of its center is provided with a lever 32, which is connected with the upper end of the link or chain 31ᵃ. Thus by depressing the said lever 32, the weighted arm 23 of the rock shaft will be raised, and the said shaft rocked in such a manner as to draw the needle valve out from its seat and permit the escape of solder from the solder receptacle.

A soldering iron D, is located at the rear of the solder receptacle C, and this soldering iron is made of copper and in two sections, one independent of the other, and one being the duplicate of the other. Each section is provided with a longitudinal semi-cylindrical or semi-circular chamber upon its inner face, the chamber being made tapering and widest at its rear, whereby a semi-circular body is obtained and an upper and a lower straight section as shown in Fig. 4. The front edge of each section is rounded off or beveled, downwardly and rearwardly as shown in Fig. 5, while the inner lower edges of the lower straight sections are formed with a groove $a$. Under this construction the soldering iron is enabled to readily pass over obstructions in its path and gather the solder over the seam.

When the two sections of the iron are brought together a conical chamber is formed; and each section is independently supported in a frame 29, which frame comprises preferably two side bars, as shown in plan view in Fig. 2, which extends upwardly and forwardly from studs formed on the soldering iron sections, and are then carried forwardly in practically a horizontal direction to a pivotal connection with a pin 30, stud or its equivalent, projected horizontally from what may be termed the inner face of the longer leg 12 of the main frame A. Thus it will be observed that each section of the soldering iron has independent action, and one section may travel upon the elevated portion of the seam while the other will move upon the depressed portion thereof.

A cord, chain or link 25, is attached to both members of the frame 29 adjacent to and over the soldering iron, and these two cords, chains or links are carried upward in a single length to a connection with a second cord, chain or link 25ᵃ, which extends through the handle standard 26 and is connected with a lever 28 located upon the handle bar, whereby upon depressing the said lever 28 the soldering iron may be raised from the surface with which it may have engaged; and the iron is held in its raised position by a catch located upon the handle bar engaging with the lever as shown in Fig. 3.

A gasoline burner E, is located at the rear of the solder receptacle C, the said burner being so placed that the flame will be directed upon the lower rear face of said receptacle; and a second burner F of the same character, is located back of the soldering iron, and is made to enter the chamber therein. This latter burner will somewhat heat the tin in advance of the iron passing over the same and in advance of the solder being deposited thereon, as the hot gases pass out at the end of the iron and the chamber acts as a check against the wind, and furthermore, by being conical, it will concentrate the heat at the point to which it is to be applied. The solder receptacle C being inclined, the hot gases issuing from the soldering iron will be deflected downward onto the tin. At the same time, the heat from the burner F will keep the soldering iron hot. The burner E, is connected with a gasoline supply pipe 34, the burner F being provided with a similar pipe 33; and both of these pipes are connected with the main supply pipe 18 leading to the tank B.

A generating pan 35, is located below each burner, in such a manner as to assume a level position when the machine is tipped back so that a rear leg 36, projected from the frame, will strike the tin or surface over which it is passed.

A frame 37, preferably consisting of two side bars, is pivoted through the medium of its side bars upon an acid receptacle G, the acid receptacle being secured to the forward or lower end of the longer leg of the frame A. The side bars of the frame 37, are pivoted at 37ᵃ below the said longer leg 12 upon the said acid receptacle, and one side bar is provided with an upward extension 38ᵃ near its rear end, arranged adjacent to a slotted downward projection 38 from the main frame, the movement of one frame upon the other being limited by a pin or set screw 39, secured to the extension 38ᵃ of the pivoted frame 37 and passed through the slot in the extension 38 from the main frame, as will be seen best in Fig. 6, and at the forward end of the frame 37, pivoted upon the acid receptacle, a yoke 40, is formed, which extends below the bottom of the said receptacle, and this yoke carries a valve 41, capable of seating itself in the outlet aperture of the said acid receptacle.

A lead wheel 42 is journaled in the rear end of the pivoted frame 37, said wheel being provided with a peripheral groove 43 in alignment with the outlet of the solder receptacle, and likewise the outlet of the acid receptacle; and this groove in the wheel is intended to receive the ridge of the seam to be soldered, thus providing an effective guide for the machine.

A brush 44, sponge, or the equivalent thereof, is located between the outlet of the acid receptacle and the guide or lead wheel 42, the brush being in alignment with the groove of the wheel; and this brush is preferably supported adjustably upon the acid receptacle through the medium of an adjustable bracket 45, usually carried by the said receptacle. This brush 44 has been omitted from Fig. 3, in order that the peripheral groove 43 of the lead wheel 42 may not be obscured.

It will be observed that through the medium of a machine constructed substantially as above set forth, the soldering of sheets of tin employed to cover large surfaces may not only be expeditiously and effectually accomplished, the soldering being as perfect as if done by hand, but at the same time the work is done in an exceedingly convenient and economic manner, while the machine will be exceedingly light and durable.

When the machine is tilted down at the back so as to raise the front end of the machine, the weight of the wheel 42 will serve to close the valve 41 upon the outlet of the acid receptacle. As soon, however, as the wheel 42, which practically forms a downward extension of the pivoted frame 37, is lowered to again engage the supporting surface, the frame 37 will be turned upon its pivot 37ª to unseat the valve 41 from the outlet of the acid receptacle G.

Having thus described my invention, I I claim as new and desire to secure by Letters Patent—

1. In a soldering machine, the combination, with a solder receptacle, a soldering iron located at the rear of the said receptacle, and a lead wheel located in advance of the solder receptacle, of an acid receptacle located in advance of the lead wheel, and means, substantially as shown and described, for heating the solder receptacle and the soldering iron, and regulating the outlets of the solder and acid receptacles, as and for the purpose specified.

2. In a soldering machine, the combination, with a wheel supported frame, a solder receptacle having a forward inclination, carried by the frame, a valve located in the solder receptacle, controlling its outlet, and a soldering iron located at the rear of the solder receptacle, said iron being constructed in sections independent of each other, of an acid receptacle located in advance of the solder receptacle, a weighted valve operating to close the outlet for the acid receptacle, a handle by means of which the machine is guided, levers carried by the said handle, connections between the said levers, the valve of the solder receptacle and the support for the soldering iron, and means, substantially as shown and described, for heating the soldering iron and solder receptacle, as and for the purpose set forth.

3. In a soldering machine, the combination, with a wheel supported frame, a solder receptacle having an inclination in a predetermined direction and an outlet at its lower portion, a valve controlling the said outlet, a soldering iron constructed in two independent sections, the iron being provided with a conical chamber extending through from end to end, and a pivoted support for the sections of the iron, of a peripherally grooved lead or guide wheel located in advance of the solder receptacle, an acid receptacle located in advance of the lead wheel, a valve controlling the outlet of the acid receptacle and operated by the lead wheel, burners one of which is located adjacent to the solder receptacle, the other burner extending into the chamber of the soldering iron, and hand levers located upon the frame of the machine, connected with the valve of the solder receptacle, and a support for the soldering iron, all combined for operation substantially as herein shown and described.

4. A soldering iron comprising two sections arranged adjacent to each other, and pivotally connected by means of a pivot that is essentially perpendicular to the opposed inner faces of the sections, whereby the sections will be allowed a pivotal movement to bring their operative or bottom faces out of registry without altering the distance between the said opposed faces, substantially as described.

5. The combination with the acid receptacle having a valve-controlled outlet, of a frame movably connected to the said receptacle and operatively connected to the valve thereof, one end of the frame being weighted to close the valve, and the said weighted end extending downward to engage the supporting surface and cause the valve to be opened, substantially as described.

6. The combination with the acid receptacle having an outlet, of a pivoted frame, a valve connected thereto and adapted to control the outlet of the acid receptacle, and a lead wheel journaled in the frame and adapted when raised off its supporting surface, to actuate said frame, whereby the valve in the outlet of the acid receptacle is closed, substantially as set forth.

7. In a soldering machine, the combination, with a frame, a solder receptacle carried by the frame and provided with a valve controlling its outlet, and a burner whereby the receptacle is heated, of a soldering iron comprising two sections, each section being provided with a semi-circular substantially conically shaped chamber, a supporting frame pivotally connected with the main frame of the machine and having independent attachment to each section of the soldering iron, a burner extending into the chambers of the sections, whereby the material to be soldered is heated in advance of its reception of the solder, and means, substantially as shown and described, for operating the valve of the solder receptacle and elevating the soldering iron, as and for the purpose set forth.

8. In a soldering machine, the combination with a wheel supported frame, a rock shaft journaled in the frame, a solder receptacle carried by the frame and provided with a needle valve, an arm projected from the rock shaft and connected with said valve, and a weighted arm independent of the valve and connected with the said rock shaft, of a soldering iron located at the rear of the solder receptacle and provided with a conical chamber extending through it from end to end, the said chamber being reduced at its forward end, a supporting frame pivotally connected with the main frame and with the soldering iron, an acid receptacle carried by the main frame in advance of the solder receptacle, the acid receptacle being provided with an automatically operated valve for the outlet thereof, a burner extending within the chamber of the soldering iron, a burner located adjacent to the lower portion of one face of the solder receptacle, a handle connected with the frame, and levers carried by said handle, one of the levers being in connection with the rock shaft and the other with the soldering iron, as and for the purpose specified.

9. A soldering machine having a lead wheel and a soldering iron provided with aligned grooves, substantially as and for the purposes set forth.

10. A soldering iron, comprising two sections movably mounted relatively to one another, said iron having in one of its faces a longitudinal groove, one half of said groove being formed in each of the sections, substantially as set forth.

CHARLES L. OLMSTEAD.

Witnesses:
NEWTON BUDD,
WILLIAM L. SHANKS.